US009649565B2

(12) United States Patent
Leyland et al.

(10) Patent No.: US 9,649,565 B2
(45) Date of Patent: May 16, 2017

(54) SERVER BASED INTERACTIVE VIDEO GAME WITH TOYS

(75) Inventors: Robert Leyland, Novato, CA (US); Mary Schuyler, Los Angeles, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 0 days.

(21) Appl. No.: 13/461,508

(22) Filed: May 1, 2012

(65) Prior Publication Data

US 2013/0296058 A1   Nov. 7, 2013

(51) Int. Cl.
| | |
|---|---|
| A63F 13/20 | (2014.01) |
| A63F 13/22 | (2014.01) |
| A63F 13/63 | (2014.01) |
| A63F 13/40 | (2014.01) |
| A63F 13/95 | (2014.01) |
| A63F 13/213 | (2014.01) |
| A63F 3/00 | (2006.01) |
| A63F 9/24 | (2006.01) |

(52) U.S. Cl.
CPC .............. *A63F 13/63* (2014.09); *A63F 13/40* (2014.09); *A63F 13/95* (2014.09); *A63F 13/20* (2014.09); *A63F 13/213* (2014.09); *A63F 13/22* (2014.09); *A63F 2003/00662* (2013.01); *A63F 2009/2486* (2013.01); *A63F 2300/10* (2013.01); *A63F 2300/1062* (2013.01); *A63F 2300/206* (2013.01); *A63F 2300/207* (2013.01); *A63F 2300/208* (2013.01); *A63F 2300/5533* (2013.01); *A63F 2300/609* (2013.01); *A63H 2200/00* (2013.01)

(58) Field of Classification Search
CPC .......... A63F 13/02; A63F 13/20; A63F 13/22; A63F 2300/206; A63F 2300/207; A63F 2300/208; A63F 2300/609; A63F 2300/1062; A63F 13/40; A63F 13/95; A63H 2200/00
USPC .......................................................... 463/39
See application file for complete search history.

(56) References Cited

U.S. PATENT DOCUMENTS

| | | | | |
|---|---|---|---|---|
| 5,746,602 A | * | 5/1998 | Kikinis .......................... 434/169 |
| 5,766,077 A | * | 6/1998 | Hongo ............................ 463/30 |
| 5,853,327 A | * | 12/1998 | Gilboa ............................ 463/39 |
| 5,977,951 A | * | 11/1999 | Danieli et al. ................ 345/156 |
| 6,267,677 B1 | * | 7/2001 | Tajiri et al. ..................... 463/43 |
| 6,290,565 B1 | * | 9/2001 | Galyean, III et al. .......... 446/99 |
| 6,352,478 B1 | * | 3/2002 | Gabai et al. .................... 463/42 |
| 6,443,796 B1 | * | 9/2002 | Shackelford .................... 446/91 |

(Continued)

*Primary Examiner* — William H McCulloch, Jr.
(74) *Attorney, Agent, or Firm* — Klein, O'Neill & Singh, LLP (57) ABSTRACT

A video game system comprising a console (such as a game console, computer, mobile device or web site), a peripheral for a gaming platform, and a toy. The gaming platform is capable of identifying the toy and a character corresponding to the toy is depicted in the video game. The video game character corresponding to the toy has certain characteristics and/or attributes. The data for these characteristics and attributes is stored on a server accessible to each compatible gaming platform. As the user uses the character to play the video game, thereby altering the character's characteristics and attributes, the updated attributes are stored by the game system to the server connected to the game system. Updated character data is thereafter available to the user for subsequent game play via any gaming platform connected to the server.

7 Claims, 7 Drawing Sheets

(56) References Cited

U.S. PATENT DOCUMENTS

| | | | |
|---|---|---|---|
| 6,494,762 B1* | 12/2002 | Bushmitch et al. | 446/268 |
| 6,554,679 B1* | 4/2003 | Shackelford et al. | 446/268 |
| 6,634,949 B1* | 10/2003 | Briggs et al. | 463/42 |
| 6,761,637 B2* | 7/2004 | Weston et al. | 463/42 |
| 6,773,344 B1* | 8/2004 | Gabai et al. | 463/1 |
| 6,959,166 B1* | 10/2005 | Gabai et al. | 434/308 |
| 6,967,566 B2* | 11/2005 | Weston et al. | 340/323 R |
| 7,037,196 B2* | 5/2006 | Kobayashi et al. | 463/29 |
| 7,081,033 B1* | 7/2006 | Mawle et al. | 446/175 |
| 7,137,861 B2* | 11/2006 | Carr et al. | 446/298 |
| 7,217,192 B2* | 5/2007 | Nishiyama | 463/43 |
| 7,300,344 B2* | 11/2007 | Fujioka | A63F 13/12 463/31 |
| 7,425,169 B2* | 9/2008 | Ganz | 446/175 |
| 7,645,178 B1* | 1/2010 | Trotto et al. | 446/268 |
| 7,749,089 B1* | 7/2010 | Briggs et al. | 472/136 |
| 7,850,527 B2* | 12/2010 | Barney et al. | 463/37 |
| 7,862,428 B2* | 1/2011 | Borge | 463/29 |
| 7,982,613 B2* | 7/2011 | Zheng | 340/572.1 |
| 8,062,089 B2* | 11/2011 | Hardin et al. | 446/175 |
| 8,142,287 B2* | 3/2012 | Podoloff | 463/39 |
| 8,172,637 B2* | 5/2012 | Brown | 446/175 |
| 8,205,158 B2* | 6/2012 | Ganz et al. | 715/706 |
| 8,287,372 B2* | 10/2012 | Hong et al. | 463/34 |
| 8,292,688 B2* | 10/2012 | Ganz | 446/175 |
| 8,317,566 B2* | 11/2012 | Ganz | 446/175 |
| 9,039,532 B2* | 5/2015 | Canessa | A63F 13/02 463/39 |
| 9,180,378 B2* | 11/2015 | Reiche | A63F 13/10 |
| 9,289,691 B2* | 3/2016 | Leyland | A63F 13/02 |
| 9,327,200 B2* | 5/2016 | Vignocchi | A63F 13/65 |
| 9,381,430 B2* | 7/2016 | Reiche | A63F 13/06 |
| 9,381,439 B2* | 7/2016 | Leyland | A63F 13/02 |
| 9,384,887 B2* | 7/2016 | Leyland | H01F 7/0263 |
| 9,387,407 B2* | 7/2016 | Vignocchi | A63F 13/65 |
| 9,393,492 B2* | 7/2016 | Leyland | A63F 13/02 |
| 9,403,096 B2* | 8/2016 | Leyland | A63F 13/02 |
| 9,427,658 B2* | 8/2016 | Borge | A63F 13/02 |
| 9,433,867 B2* | 9/2016 | Leyland | A63H 3/003 |
| 9,474,961 B2* | 10/2016 | Leyland | A63F 13/02 |
| 2001/0021669 A1* | 9/2001 | Gabai et al. | 463/39 |
| 2001/0031652 A1* | 10/2001 | Gabai et al. | 463/1 |
| 2002/0022507 A1* | 2/2002 | Dan et al. | 463/1 |
| 2002/0042301 A1* | 4/2002 | Dobrusskin et al. | 463/43 |
| 2002/0137427 A1* | 9/2002 | Peters et al. | 446/454 |
| 2002/0183119 A1* | 12/2002 | Fessler | 463/47 |
| 2003/0027636 A1* | 2/2003 | Covannon et al. | 463/42 |
| 2003/0060288 A1* | 3/2003 | Oakes | 463/51 |
| 2005/0033601 A1* | 2/2005 | Kirby et al. | 705/1 |
| 2005/0059483 A1* | 3/2005 | Borge | 463/29 |
| 2006/0035692 A1* | 2/2006 | Kirby et al. | 463/6 |
| 2006/0080539 A1* | 4/2006 | Asami et al. | 713/182 |
| 2006/0116192 A1* | 6/2006 | Okada | 463/20 |
| 2007/0066396 A1* | 3/2007 | Weston et al. | 463/39 |
| 2007/0097832 A1* | 5/2007 | Koivisto et al. | 369/63 |
| 2007/0187507 A1* | 8/2007 | Natsume et al. | 235/462.1 |
| 2007/0211047 A1* | 9/2007 | Doan et al. | 345/419 |
| 2008/0081694 A1* | 4/2008 | Hong et al. | 463/34 |
| 2008/0085773 A1* | 4/2008 | Wood | 463/43 |
| 2008/0153594 A1* | 6/2008 | Zheng | 463/39 |
| 2008/0274811 A1* | 11/2008 | Ganz et al. | 463/42 |
| 2008/0309010 A1* | 12/2008 | Bowling | 273/243 |
| 2009/0005139 A1* | 1/2009 | Morimoto | 463/6 |
| 2009/0051114 A1* | 2/2009 | Robbers et al. | 273/293 |
| 2009/0069084 A1* | 3/2009 | Reece et al. | 463/32 |
| 2009/0137185 A1* | 5/2009 | Zheng | 446/268 |
| 2009/0137323 A1* | 5/2009 | Fiegener et al. | 463/43 |
| 2009/0200366 A1* | 8/2009 | Kasahara | 235/375 |
| 2009/0315893 A1* | 12/2009 | Smith et al. | 345/473 |
| 2010/0151940 A1* | 6/2010 | Borge | 463/29 |
| 2010/0167623 A1* | 7/2010 | Eyzaguirre et al. | 446/330 |
| 2011/0028219 A1* | 2/2011 | Heatherly et al. | 463/42 |
| 2011/0098092 A1* | 4/2011 | Reiche, III | 463/1 |
| 2011/0161093 A1* | 6/2011 | Ganz | 705/1.1 |
| 2011/0265018 A1* | 10/2011 | Borst et al. | 715/757 |
| 2011/0300944 A1* | 12/2011 | Raynal | 463/42 |
| 2012/0015734 A1* | 1/2012 | Lipman et al. | 463/42 |
| 2012/0046102 A1* | 2/2012 | Tully | 463/31 |
| 2012/0172131 A1* | 7/2012 | Boswell et al. | 463/42 |
| 2012/0178537 A1* | 7/2012 | Ganz et al. | 463/42 |
| 2012/0208642 A1* | 8/2012 | Borst | 463/42 |
| 2012/0295699 A1* | 11/2012 | Reiche | 463/29 |
| 2012/0295700 A1* | 11/2012 | Reiche | 463/29 |
| 2012/0295702 A1* | 11/2012 | Otero et al. | 463/31 |
| 2012/0295703 A1* | 11/2012 | Reiche et al. | 463/31 |
| 2012/0295704 A1* | 11/2012 | Reiche et al. | 463/31 |
| 2012/0295714 A1* | 11/2012 | Reiche et al. | 463/42 |
| 2012/0315821 A1* | 12/2012 | Hayakawa | 446/297 |
| 2013/0017887 A1* | 1/2013 | Keithline et al. | 463/35 |
| 2013/0165223 A1* | 6/2013 | Leyland et al. | 463/30 |
| 2013/0196766 A1* | 8/2013 | Leyland et al. | 463/36 |
| 2013/0296058 A1* | 11/2013 | Leyland et al. | 463/42 |
| 2014/0100029 A1* | 4/2014 | Reiche et al. | 463/31 |
| 2014/0162785 A1* | 6/2014 | Reiche et al. | 463/35 |
| 2014/0179446 A1* | 6/2014 | Zuniga et al. | 463/47 |
| 2014/0364240 A1* | 12/2014 | Leyland | A63H 3/003 463/43 |
| 2015/0080129 A1* | 3/2015 | Leyland | A63F 13/02 463/31 |
| 2015/0087427 A1* | 3/2015 | Wane | A63F 13/213 463/43 |
| 2015/0174479 A1* | 6/2015 | Reiche | A63F 13/12 463/31 |
| 2015/0217190 A1* | 8/2015 | Coyne | A63F 13/63 463/31 |
| 2015/0238854 A1* | 8/2015 | Olson | A63F 13/235 463/42 |
| 2015/0238869 A1* | 8/2015 | Canessa | A63F 13/02 463/43 |
| 2016/0125696 A1* | 5/2016 | Vignocchi | A63F 13/65 463/30 |
| 2016/0144273 A1* | 5/2016 | Barney | A63F 13/327 463/37 |
| 2016/0144283 A1* | 5/2016 | Martin | A63F 9/24 463/29 |
| 2016/0184701 A1* | 6/2016 | Weston | A63F 13/10 463/42 |
| 2016/0199747 A1* | 7/2016 | Weston | A63H 3/00 463/42 |
| 2016/0310839 A1* | 10/2016 | Leyland | A63F 13/95 |

* cited by examiner

SERVER BASED INTERACTIVE VIDEO GAME WITH TOYS

BACKGROUND OF THE INVENTION

The present invention relates generally to video games and, more particularly, to a video game and a toy used in connection with the video game.

Video games provide fun and enjoyment for many. Video games allow game players to participate in a variety of simulated activities. Video games allow game players to perform roles and experience activities that the game players may not be able or desire to experience directly, whether due to cost, danger, or equipment concerns, or simply due to a role or activity being a fantasy.

Video games, being generally provided by way of an electronic device and associated display, often lack a physical component by which a player may touch and hold a representative object associated with video game play or otherwise have a physical object representative of video game play. Despite the sometimes intense graphics action of various video games, the game play experience remains two dimensional. Merely interacting with a displayed simulated environment may not allow game players to fully relate to game play, with a sharply distinct separation between a game play world and the world physically inhabited by the game players.

BRIEF SUMMARY OF THE INVENTION

One aspect of the invention provides a video game system comprising a console (such as a game console, computer, mobile device or web site), a peripheral for a gaming platform, a toy. The gaming platform is capable of identifying the toy and a character corresponding to the toy is depicted in a video game. The gaming platform may be capable of identifying the toy via direct communication with the toy or via a peripheral for a gaming platform, and information regarding the character may be available to the gaming platform from a server in communication with the gaming platform. The video game character corresponding to the toy has certain characteristics and/or attributes, such as health, strength, power, speed, wealth, shield, weapons, or achievement level, for example. The data for these characteristics and attributes is stored on a server accessible to the gaming platform. As the user uses the character to play the video game, thereby altering the character's characteristics and attributes in the process, the updated attributes are stored by the game system to the server in communication with the game system. Updated character data is thereafter available to the user for game play via any gaming platform in communication with the server. These and other aspects of the invention are more fully comprehended upon review of this disclosure.

DETAILED DESCRIPTION

Figure 1:
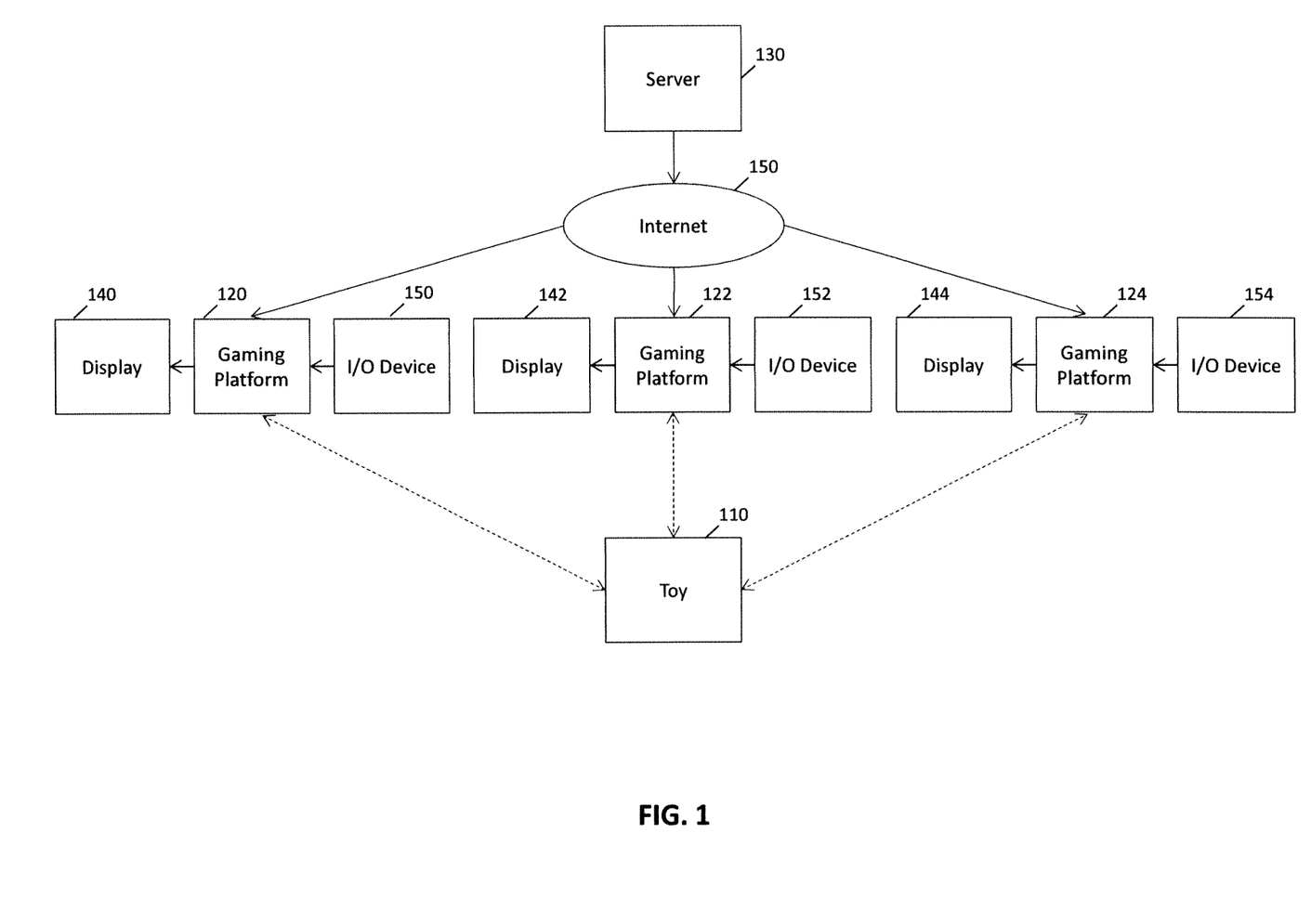
FIG. 1 is a block diagram illustrating an example of a system in accordance with aspects of the present invention.

FIG. 1 is a block diagram illustrating an example of a video game system in accordance with aspects of the present invention. Referring to FIG. 1, an embodiment of a system in accordance with aspects of the present invention includes gaming platforms 120, 122, 124 with a processor for executing program instructions providing for game play and associated circuitry, I/O devices 150, 152, 154 (such as a video game controller, keyboard, mouse, joystick, touch-screen display, voice input or other known devices), a display devices 140, 142, 144, a toy 110 and a server 130 (or plurality of servers). The gaming platforms 120, 122, 124 may be, in various embodiments, one, some, or any of a variety of processing devices capable of executing a video game program and communicating with a remote server, such as a traditional video game console (e.g. PlayStation, Xbox, Wii, WiiU), portable game console (e.g. Nintendo NDS, PlayStation Portable), a personal computer, a laptop, a mobile computing device (e.g. iPad or other tablet), or other mobile device (e.g. cell phone, iPhone, Blackberry, Droid operated phone, MP3 player). The platforms provide video images to display 140, 142, 144 coupled respectively thereto. The platform may also provide audio outputs either to display 140, 142, 144, or to a separate audio device not depicted in FIG. 1. The display device is generally coupled to the gaming platform by a cable, although in some embodiments a wireless connection may be used. In many embodiments, the display device is a liquid crystal display. In some embodiments, the display device is a television. A display screen 131 of the display device displays video images of game play, generally as commanded by the processor or other associated circuitry of the gaming platform.

The user may control the gaming platforms 120, 122, 124 and game play on the gaming platforms 120, 122, 124 via I/O device 150, 152, 154 coupled respectively thereto. Gaming platform 120 communicates with server 130 via known client/server models and networking techniques, including known internet and cellular communication protocols.

In some embodiments, the gaming platforms 120, 122, 124 are each able to uniquely identify toy 110. The identification of toy 110 may be performed either through a direct coupling between toy 110 and the gaming platforms 120, 122, 124, either through a wired connection (e.g. USB), through a wireless coupling (e.g. Bluetooth or WiFi) or other known object recognition methods, such as recognizing the toy 110 by capturing a visual image of the toy and determining identity, or by scanning a bar code or other code printed on the toy 110. In other embodiments, the gaming platforms 120, 122, 124 are able to identify toy 110 via a peripheral coupled to platforms 120, 122, 124.

Figure 2:
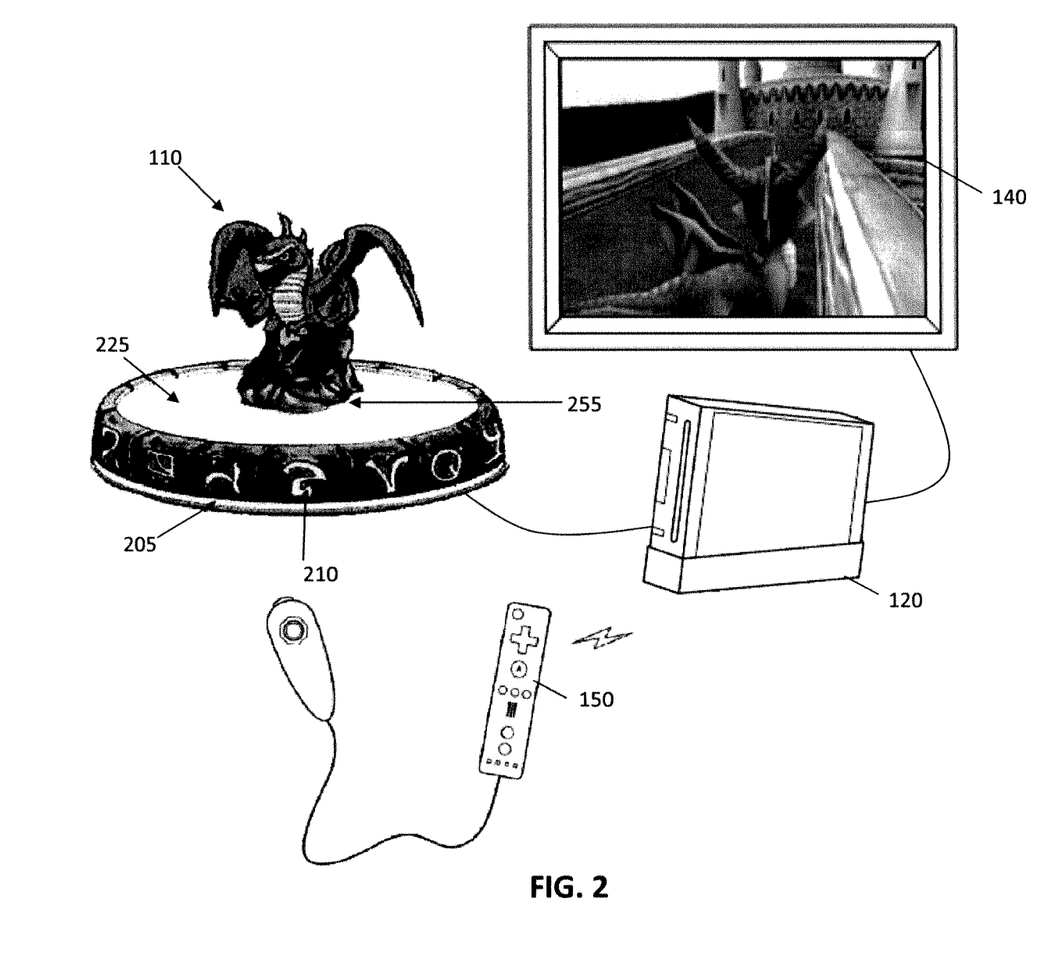
FIG. 2 illustrates an example of a video game system in accordance with aspects of the invention.

The peripheral device 210, in some embodiments and as shown in FIG. 2, has a substantially flat upper surface 225 for placement of toys thereon. The game player generally places game toys, for example, toy 110 in the form and representative of a dragon as shown in FIG. 2, on the flat surface 225 of the peripheral device 210 during game play. The toy 110 is generally in the form of and representative of a game item such as a game character or other game item. In most embodiments, the toy is associated with a game character during game play.

Each toy may include machine-readable information, for example, memory, a radio frequency identification (RFID) tag or a barcode. The machine-readable information may be sensed, read, and/or in some embodiments written, by the peripheral device, in some embodiments indirectly by way of sending data and commands to the toy to write the data to memory of the toy. The machine-readable information may include a numeric identifier. The machine-readable information allows the peripheral device, or the processor of the gaming platform, to distinguish one toy from other toys, and the machine-readable information may therefore be considered to include a toy identifier, and in some embodiments, each particular toy has its own distinct identifier. In addition, in many embodiments the machine readable information includes additional information about a corresponding game character, including in some embodiments, status of the game character in a game. In still other embodiments, the toy 110 may include readable/writeable memory such as RAM for storing information related to the toy or the game character corresponding to the toy.

When a toy 110 is read by the peripheral device 210, the peripheral device 210 provides the gaming platform 120 an indication of the identifier and status information of the toy, and generally the processor of the gaming platform commands display of a corresponding game character or otherwise makes the corresponding game character available in game play. Likewise, when a toy in the form of an article such as a hat or weapon is placed on the peripheral device, the processor may make a corresponding article appear in the game and the article may affect changes or the ability to make changes in the game. For example, when a hat toy and a character toy are concurrently on the peripheral device, the corresponding character in the game may possess the corresponding hat. Thus, video game play may be affected by use of real world objects, objects which may also be utilized for play and/or observation separate from video game play.

Once a gaming platform 120, 122 or 124 recognizes and identifies the toy 110, a virtual representation of the toy 110 is presented in a game operating on gaming platform 120, 122 or 124 and displayed on respective displays 140, 142, or 144. The user may control the virtual representation of the toy 110 within the game via the respective I/O device 150, 152 or 154. The virtual representation of the toy 110 may have one or more characteristics and/or attributes associated with it, such as health, strength, power, speed, wealth, shield, weapons, or achievement level, for example. A toy 110 that has never been used within the gaming environment may have initial attributes and/or characteristics that are preprogrammed in the gaming software, gaming platform or server. As the user plays the game utilizing, at least in part, the virtual representation of the toy 110, the one or more characteristics and/or attributes associated with toy 110 may be altered.

For example, as a user progresses through different challenges within the game using the virtual representation of toy 110, the user may discover and collect various virtual items usable by the virtual representation of toy 110 that alter the characteristics and/or attributes of the virtual representation of the toy 110. For example, the user may obtain, via his virtual representation of toy 110, a new sword that may alter the weapons associated with the virtual representation of toy 110, or virtual gold that may alter the wealth associated with the virtual representation of toy 110. As another example, the user may obtain, via his virtual representation of toy 110, a virtual portion to increase the strength the virtual representation of toy 110. As another example, the reward for completing certain challenges within the game may be to increase the health, wealth, strength, speed, agility or other characteristics or attributes of the virtual representation of the toy 110, and the penalty for failing to complete those tasks may be a decrease in one or more of those characteristics or attributes. These one or more characteristics or attributes may be altered in innumerable ways via game play, and these examples are only illustrative.

At the completion of a particular gaming session, or periodically throughout a gaming session, the changes in attributes to the virtual representation of toy 110 are stored by gaming platform 120, 122 or 124 to server 130. This attribute and/or characteristic data is stored on said server 130, for example via a relational database, and is associated with the particular toy 110 for subsequent access by the user utilizing toy 110 in subsequent gaming sessions either on the same or different gaming platforms. Accordingly, the updated data pertaining to the one or more characteristics and/or attributes associated with the virtual representation of toy 110 may persist across platforms. These attributes may also be stored elsewhere, such as a memory associated with platform 120, 122 or 124 or a memory associated with toy 110.

In a subsequent gaming session on either the same gaming platform or a different gaming platform, the particular gaming platform is able to access the updated data pertaining to the one or more characteristics and/or attributes for use in the subsequent gaming session. The server is able to utilize the identification of toy 110, described above, and retrieve the up to date data associated with the virtual representation of that toy 110 when prompted by a gaming platform 120, 122 or 124 in response to an identification of toy 110. The server 130 may then transmit that data to gaming platform 120, 122, or 124 for use in that game session.

The transmission of data pertaining to toy 110 from server 130 may happen at a number of stages in various embodiments. For example, the data transmission may begin immediately upon identification of toy 110 prior to the beginning of game play. In another embodiment, game play may be allowed to commence prior to complete or partial retrieval of data pertaining to toy 110 so as to allow game access more quickly. In still other embodiments, the data may only be retrieved in response to a user request.

Once retrieved from server 130, the gaming console 120, 122, 124 may continue to communicate with server 130 or may, in alternative embodiments, store the data in a local memory associated with the platform or toy 110. In such embodiments, the data may be updated to server 130 periodically, at the end of a gaming session, in response to a user request, or at any other interval or game play event.

In certain embodiments, the user may establish an account where the account information is also stored on server 130 and/or on gaming platforms 120, 122, 124. The user may access the account by entry of a username and password, for example. The server 130 may subsequently create a linkage or association between the account and toy 110 reflecting that toy 110 has been used in connection with that account. The user account may have multiple toys or objects associated and/or linked to it. Such a system may be advantageous for various reasons. In one embodiment, a user may log into the user's account on a gaming platform 120, 122, 124. Data for the various toys and objects associated and/or linked to that user account may be retrieved from server 130 in response to the user logging into the account or in response to the user having a first toy 110 identified by a gaming platform 120, 122, 124, which may reduce possible delay resulting from data being retrieved from the server when a new toy is desired for game play.

In still other embodiments, a single toy 110 may have various virtual characteristics stored on server 130 for different user accounts. For example toy 110 may be associated with the accounts of User A and User B. User A may have played in the various gaming environments using toy 110 more than User B. When User A logs into his or her account and uses toy 110 in connection with a gaming platform 120, 122, 14, the data associated with the characteristics of the representation of toy 110 resulting from User A's progression in the various gaming environments using toy 110 will be reflected, for example. User B may the also use toy 110 in connection with his or her account, but have data specific to User B's account with respect to toy 110 reflecting the characteristics of the representation of toy 110 resulting from User B's progression in the various gaming environments using toy 110 or other objects associated with User B's account.

For example, a user may have a toy 110 such as a dragon depicted in FIG. 2. In a first gaming session, a user may place the toy 110 on a peripheral connected to the user's gaming console 120. The game console identifies the toy 110 as a particular toy 110 dragon or as a dragon that has been linked to a user account. The user plays the game using, in part, a virtual representation of the toy 110 dragon. In the course of that game play, the user accomplishes various tasks earning virtual toy 110 dragon increases in strength and speed. Data reflecting those increases are transmitted to and stored in a memory associated with server 130. In a subsequent gaming session, for example on the user's same console, the user places the toy 110 dragon on the peripheral associated with that gaming device 120. The gaming device is able to identify the toy 110 dragon and retrieve the up to date data regarding the increases in strength and speed accomplished in the prior gaming session for use in the subsequent gaming session. During the course of the second gaming session, the user accomplishes various tasks earning virtual toy 110 dragon still further increases in other attributes, for example, defense and agility. Data reflecting those increases are transmitted to and stored in a memory associated with server 130 so that a complete set of up to date data reflecting the virtual toy 110 is stored. In still another subsequent gaming session, for example, on the user's mobile device, the mobile device recognizes and identifies the toy 110 dragon and connects to server 130 to retrieve the up to date data reflecting the strength, speed, defense and agility associated with toy 100 dragon for use in that game session. The same sequence can be performed in various gaming sessions across any compatible gaming device, thereby preserving the user's progress associated with toy 110 across each session regardless of the gaming platform.

In alternative embodiments, the toy 110 may have an identification code associated with it. User may access for game play the data reflecting the one or more characteristics and/or attributes stored on server 130 associated with toy 110 by entering the identification code, rather than utilizing the toy 110 itself. In further alternative embodiments, the user may be able to link toy 110 to a user account, such that the user may access the data for game play the data reflecting the one or more characteristics and/or attributes stored on server 130 associated with toy 110 by entering the user's account credentials.

Referring to FIG. 2, the peripheral device 210 may also provide the capability to read and write information to a toy FIG. 110 in alternative embodiments. The processor in gaming console 120, responsive to inputs from the user input devices and the peripheral device, generally commands display on the display device 140 of game characters in and interacting with a virtual world of game play and possibly each other. In addition, the processor, responsive to inputs from the peripheral device 210, may be used to add characters and objects to the virtual world, with the characters able to manipulate the added objects and move about the virtual world. For example, the processor may include characters in game play based on inputs from the peripheral device 210, and the processor may control actions and activities of game characters based on inputs from the user input devices.

The instructions providing for game play are generally stored on removable media, for example, an optical disk. Accordingly, the game console may include an optical drive, for example, a DVD-ROM drive, for reading the instructions for game play. In some embodiments, the game console may be a personal computer, including similar internal circuitry as herein described, as well as, for example, a built-in display and built-in user input devices, such as a keyboard and a touch pad. In other embodiments, the instructions providing for game play may be stored in a remote server that are accessed by a computer or mobile device. In yet other embodiments, the instructions providing for game play may be stored locally on the gaming device memory.

In the embodiment of FIG. 2, the display screen 140 shows a screen shot of video game play. As illustrated, the screen shot shows a display of a character, generally controlled by and animated in accordance with user inputs, approaching an inanimate item in the form of what may be considered a castle.

Figure 3:
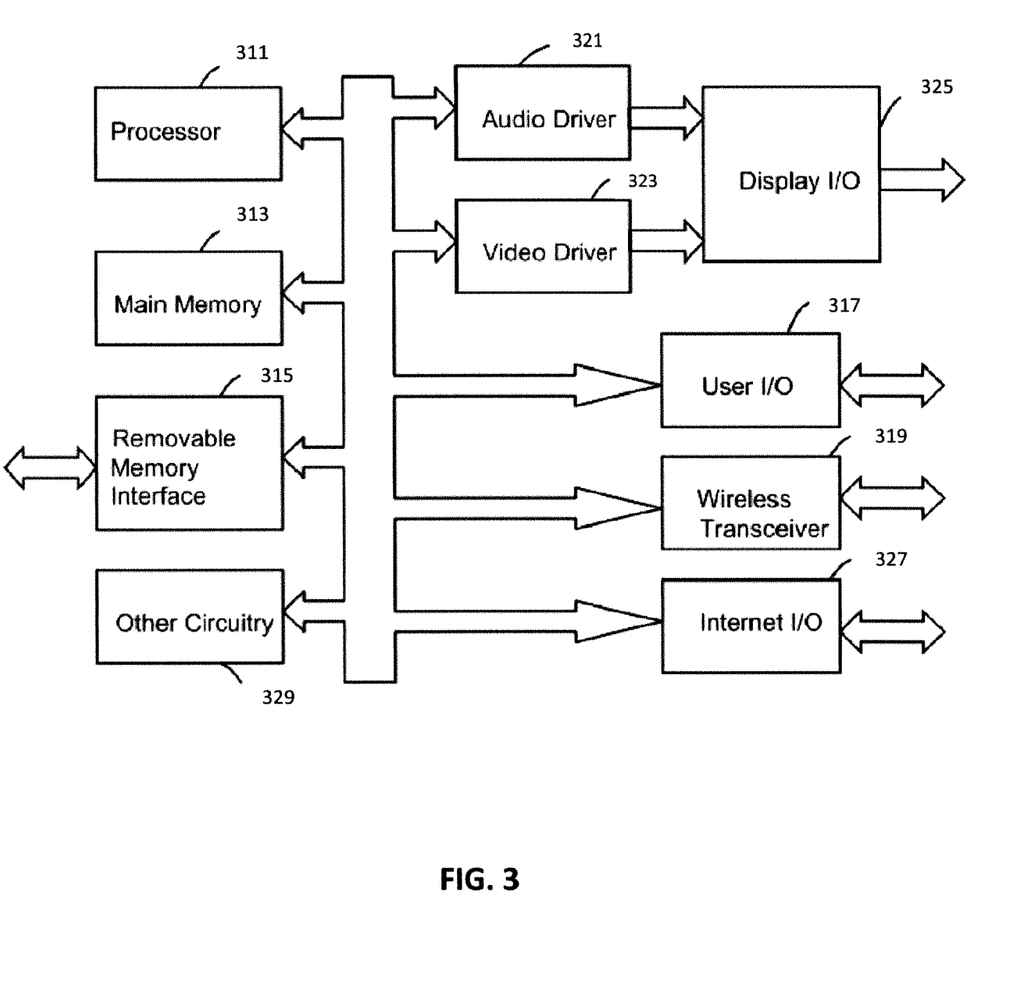
FIG. 3 is a block diagram illustrating an example of a gaming platform in accordance with aspects of the present invention.

FIG. 3 is an example of a block diagram of a processor and associated circuitry, for example, for a game console, useful in accordance with aspects of the invention. As shown in FIG. 3 a processor 311 is connected to other components via a bus. The other components include a main memory 313 and a removable memory interface 315 generally coupled to a removable memory device, for example, a DVD-ROM drive. The processor may execute instructions retrieved from the removable memory device to control game play and store game state information in the main memory. For example, the instructions may be for determining possible movements, positions, and locations of a game character.

The processor is coupled to an audio driver 321 and a video driver 323. The audio driver produces sound signals and the video driver produces image signals. The sound signals and image signals are transmitted from the game console via a display I/O device 325. The display I/O device generally supplies the sound and image signals to a display device external to the game console. Sound signals may also be supplied to a peripheral device such as a toy reader.

The processor may also be coupled to a user I/O device 317, a wireless transceiver 319, an Internet I/O device 327, and other circuitry 329. The user I/O device may receive signals from a peripheral device and/or signals from a keyboard, a mouse, and/or a game controller, with generally the keyboard, mouse, and/or controller being used by a user and providing user inputs, for example, during game play. Alternatively or additionally, the game console may receive user inputs via the wireless transceiver. The Internet I/O device provides a communication channel that may be used, for example, for multiple player games.

Figure 4:
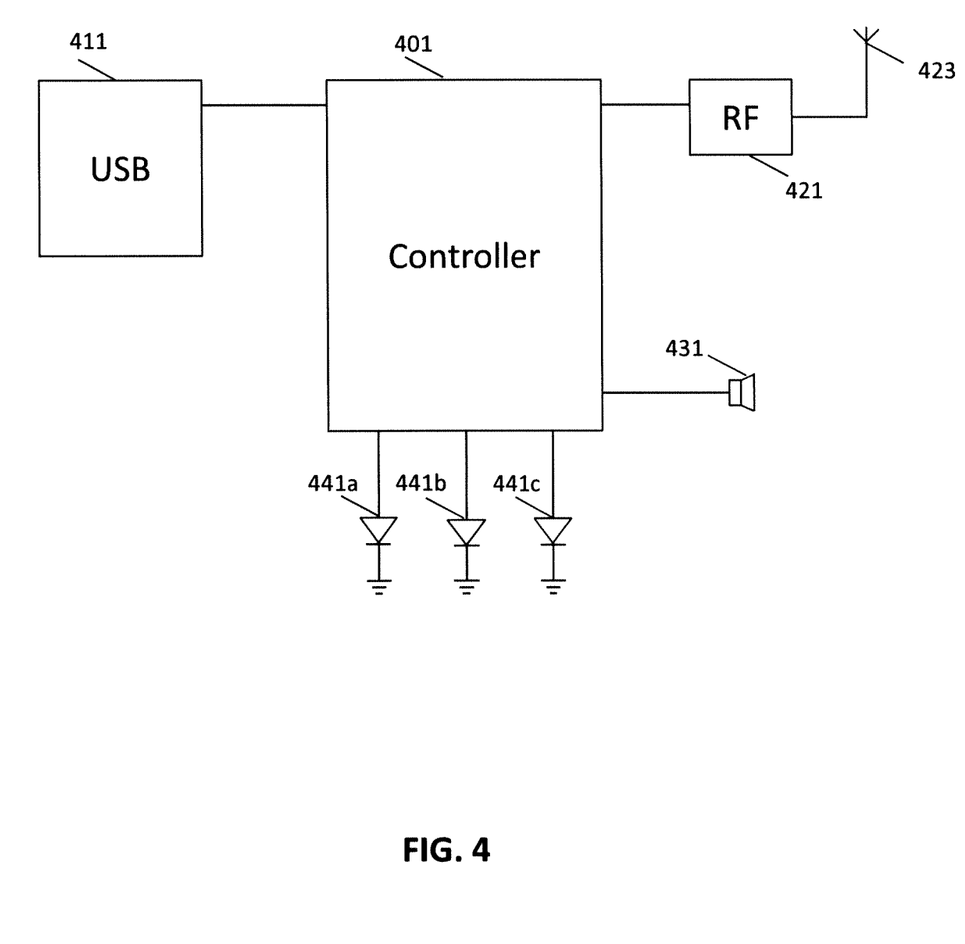
FIG. 4 is a block diagram of a video game peripheral in accordance with aspects of the invention.

FIG. 4 is a block diagram of a video game peripheral in accordance with aspects of the invention. The peripheral may be used in some embodiments as the peripheral device 210 of FIG. 2. The peripheral may be used to provide information from the toy to a gaming platform and, in some embodiments, from the gaming platform to the toy. Accordingly, the peripheral includes a universal serial bus (USB) interface 411 to communicate with the gaming platform. In some embodiments, the peripheral may use a different interface, for example, a wireless interface for communication with the gaming platform. The information communicated between the peripheral and the gaming platform may be encrypted, and the information read from or written to the toy by the peripheral may also be encrypted.

The peripheral also includes a radio-frequency interface 421 to communicate with toys. In many embodiments, the radio-frequency interface is an RFID interface. In other embodiments, the peripheral may include a different interface for communicating with toys, such as an optical interface or a wired interface. It is further understood that in some embodiments, the peripheral device (as depicted in FIG. 4) may be removed. For example, in certain embodiments of the present invention, the functionality of the peripheral device may already be included, in whole, or part, within the gaming platform, such as for example, NFC or RFID equipped mobile device.

In one embodiment of an optical interface the toy includes a light source, for example an LED, to provide information of the machine readable information and a photodiode to receive information of commands, with circuitry operable within the toy to provide for associated operation of the LED and photodiode in performing communication functions. Power may be provided to the toy by way of a battery, by way of RFID operations, or by other sources. In such an embodiment the peripheral device similarly includes a photodiode and LED for communication with the toy.

In another embodiment the peripheral device includes an imaging device, for example a CCD and associated circuitry. In such embodiments the imaging device may generate an image, for analysis by the peripheral device or in most embodiments by the gaming platform, with the image providing information related to the toy. In some embodiments identity of the toy may be determined by shape or other features, such as color or reflectivity, of the toy or portions of the toy. Similarly, identity and other information of the toy may be provided by image information placed on the toy, including, for example, information of stickers placed on the bottom of the toy, placed either prior to receipt of the toy by a user or by the user, in which case the information may be changed by the user in accordance with game play results. The toy may instead, or in addition may include bar code or bar code like information, with the peripheral device including bar code scanning components.

Further in some embodiments the toy may include a wired connection to the peripheral device, or in some embodiments, a wired connection to the gaming platform, possibly dispensing with the peripheral device. Similarly, in some embodiments the toy may include wireless communication capabilities of the type commonly used with computers, for example Bluetooth, NFC or Wi-Fi capabilities.

The peripheral may include a controller 401 that is coupled to the USB interface and the radio-frequency interface. The controller adapts the signals between protocols used by the two interfaces. In some embodiments, the controller communicates with the radio-frequency interface based on commands received over the USB interface. For example, the controller may receive commands to determine what toys are present on the peripheral or to read from or write to a particular toy. In other embodiments, the controller may independently communicate with the radio-frequency interface and supply resulting information to a gaming platform over the USB interface. For example, the controller may, via the radio-frequency interface, regularly detect what toys are newly present on the peripheral and report the detected toys to the gaming platform via the USB interface. The controller generally includes a programmable device such as a microprocessor performing program instructions. The program instructions may be stored in the peripheral as firmware or downloaded from the gaming platform.

The peripheral also includes, in some embodiments, a loudspeaker 431. The loudspeaker provides audio signaling to game players and the signaling may relate to a particular toy present on the peripheral. In some embodiments, the peripheral includes visual indicators such as light-emitting diodes 441a-c. The diodes may, for example, be illuminated with intensities or colors that signal performance in the video game of characters associated with toys on the peripheral. Both the loudspeaker and visual indicators are coupled to the controller. The controller signals the loudspeaker and visual indicators to operate according to commands received via the USB interface.

Figure 5:
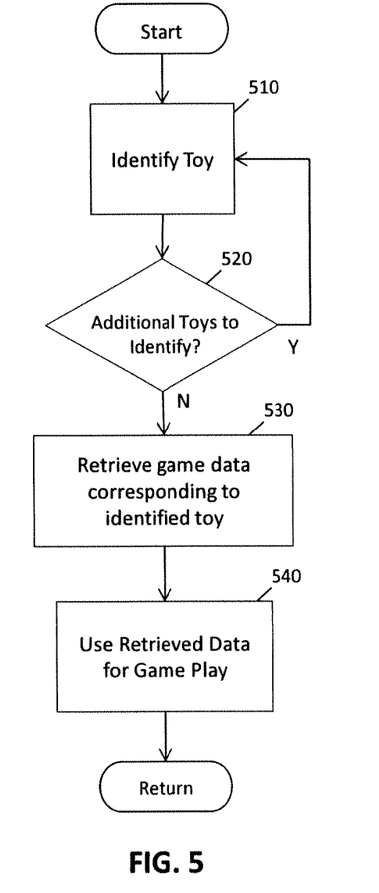
FIG. 5 is a flowchart of a process for identification of a toy and retrieval of data associated with toy in accordance with aspects of the invention.

FIG. 5 is a flowchart of a process for identification of a toy 110 and retrieval of data associated with toy 110 in accordance with aspects of the invention. The process may be implemented by a video game peripheral, a video gaming platform, or a combination of devices. Additionally, the process may be implemented using a processor configured by program instructions. The process may be performed utilizing a standardized protocol, for example, the ISO/IEC 14443 standard for Identification Cards. Accordingly, the process may communicate with toys via radio-frequency communication.

In block 510, the process identifies toys in a defined region. For example, the process may determine what toy 110 is on the surface of a video game peripheral as shown in FIG. 2. In various embodiments, the toy 110 may be identified by RFID, barcodes, or optical recognition. In one embodiment, identification of toys includes a video game peripheral reading identifiers of the toys and supplying the identifiers to a video gaming platform.

In block 520, the process determines if any additional toys must be identified. If so, further identification is conducted in accordance with block 510. If no further toys require identification, the process proceeds to block 530.

In block 530, data corresponding to the identified toy is retrieved, for example, via a connection to a remote server, as depicted in FIG. 1. In alternative embodiments, data may be retrieved from memory on the gaming device, peripheral or the toy itself. In block 540, the retrieved data for the one or more identified toys is used, at least in part, in conducting the game play on the gaming device.

Figure 6:
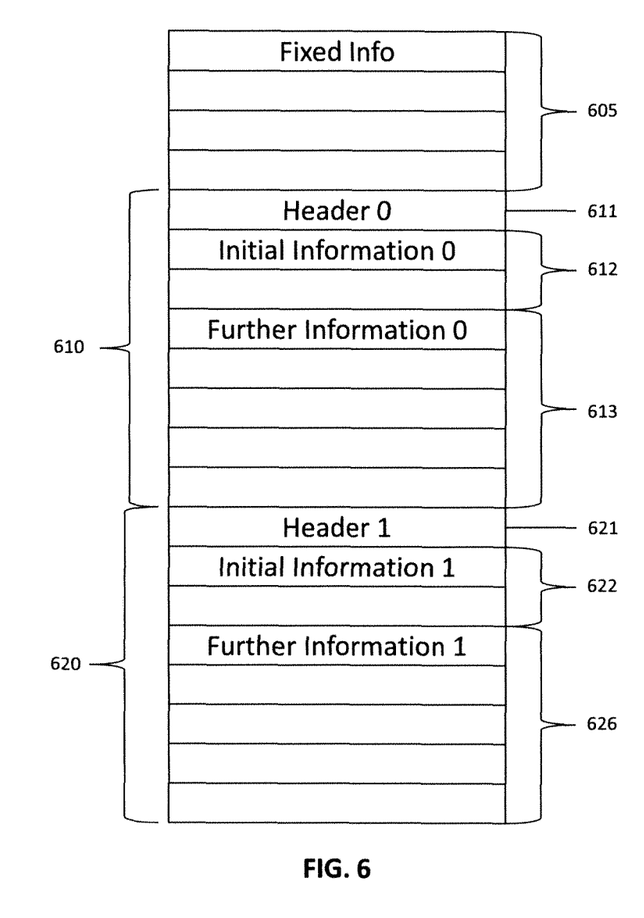
FIG. 6 is a diagram of data structure in accordance with aspects of the invention.

FIG. 6 is a diagram of data structure in accordance with aspects of the invention. The structure may be used to store data in a server or in alternative embodiments in a memory on the gaming device, in a memory on a peripheral to the gaming device or in a memory of a toy, or any combination thereof. Information about the toy, such as its characteristics and its status, are stored at various locations in the data structure. Although various fields of the data structure are shown in particular locations in FIG. 6, the data structure may use a different arrangement of the fields.

The data structure includes an area of fixed information 605. The fixed information includes information that identifies a type of toy and a particular instance of the toy, for example, the fixed information may include a 32-bit serial number. The fixed information may also include an identification of objects related to the toy, such as an identification of a trading card. The fixed information generally includes a field for data verification, for example, a cyclic-redundancy check value or checksum. The fixed information is generally written when the toy is created and not thereafter changed.

The data structure also includes a first data area 610 and a second data area 620. Each of the data areas contains corresponding fields for certain values representing status information about a game play character associated with the toy. However, the first data area and the second data area contain values that reflect the toy's status at different times. For example, the first data area may contain current values and second data area may contain previous values. How which of the data areas is current may be determined and controlled is described further below.

The first data area 610 includes a first header 611. The first header includes information about the toy that may change frequently during game play, such as fields that store score values, experience levels, or money values. The first header may also include a field indicating how much cumulative time the toy has been used for game play. The first header also contains a sequence field that may be used to determine whether the first data area contains current data.

The first data area 610 includes a first initial information area 612. The first initial information area includes information about the toy for use in adding the character associated with the toy to game play. For example, the first initial information area may include a field that stores a name for the toy. The first initial information area may include additional fields that store information useful for displaying a representation of the character associated with the toy in the game. For example, there may be information indicating upgrades that have been acquired for the character associated with toy or objects the character may be wearing, such as hats. In some embodiments, however, the fixed information may contain sufficient information for adding the character associated with to the toy to game play, with the fixed information used instead of the initial information.

The first data area 610 includes a first further information area 613. The first further information area includes fields that indicate additional information about the character's status beyond the information contained in the first header and the first initial information area. The fields in the first further information area may include, for example, a value indicating when the character associated with the toy most recently joined the game, a value indicating when the toy was first used in the game, an indication of a player to which the toy belongs, and an indication of what challenges or skill tests the character associated with the toy has completed in the game.

The first data area generally includes one or more fields for data verification, for example, checksums. In one embodiment, the first header includes three checksums: a checksum for the entire first data area, a checksum for the initial information area and a checksum for the header itself. The inclusion of three checksums may allow the corresponding areas to be verified or updated without reading or writing other areas.

The second data area 620 includes a second header 621, a second initial information area 622, and a second further information area 623. Each of the areas in the second data area corresponds to a like named area in the first data area. Two data areas may be advantageous to provide cycling areas on consecutive saves and also may add redundancy for the case of partial updates and write failures. In some embodiments, the data structure includes additional data areas, for example, a third data area and a fourth data area.

Figure 7:
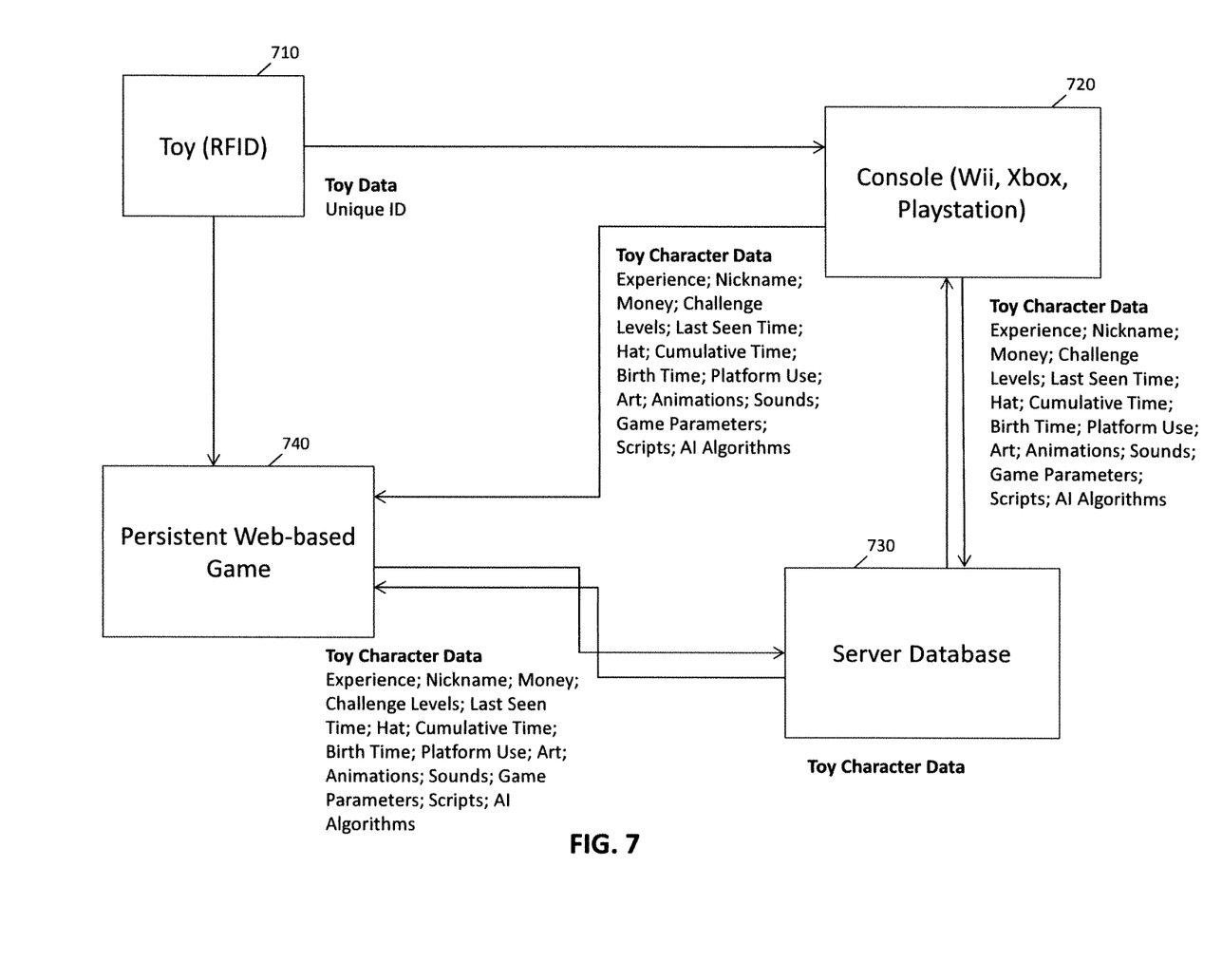
FIG. 7 is a diagram of an embodiment of data flow between various gaming platforms utilizing aspects of the invention disclosed herein.

FIG. 7 is a diagram of an embodiment of data flow between various gaming platforms utilizing aspects of the invention disclosed herein. In the embodiment illustrated in FIG. 7, toy 710 includes an RFID tag to provide unique identification of the toy 710 as described elsewhere in the specification. It is understood that in various embodiments other identification techniques may also be used consistent with the descriptions herein. Gaming platforms 720 (e.g. Wii, Xbox, Playstation, PC, mobile device) can receive the RFID tag, or other identification information, for example via a peripheral as described above or through other techniques described herein. During game play on gaming platforms 720, information related to the toy 710 (referred to in FIG. 7 as "Toy character data") is updated. The updated toy character data is sent to and stored on a server database 730. In subsequent gaming sessions, the up to date toy character data can be transmitted from server database 730 to any gaming console 720 in communication with server database 730 for use in gaming sessions. The toy character data may comprise one or more of the following: experience, nickname, money, challenge levels, last seen time, hat, cumulative time, birth time and platform use, art, animations, sounds, game parameters, scripts and AI algorithms.

In some embodiments, a web-based game 740 may also be provided for use in connection with toy 710. The web-based game 740 may receive toy character data directly from a console 720, or may also receive toy character data from the server database 730. The toy character data may be transmitted between these various systems via known networks, such as internet networks, cellular data networks or LANs.

In still other embodiments, not depicted in FIG. 7, some or all of the character data may also be stored on toy 710 or on a memory associated with console 720. This may be advantageous so that users may have access to certain character data in the absence of a server connection.

Although the invention has been discussed with respect to various embodiments, it should be recognized that the invention comprises the novel and non-obvious claims supported by this disclosure.

What is claimed is:

1. A toy usable in connection with a gaming system, said toy comprising:
   a toy figure; and
   an electronic identification device within the toy figure containing a code uniquely identifying said toy;
   said gaming system comprising:
   a first game system configured to be coupled with a first peripheral device, wherein said first peripheral device is configured to read said code uniquely identifying said toy from said electronic identification device on said toy; wherein said first game system is configured by program instructions to provide for game play, including providing a representation of said toy figure for game play within a game environment, in which a user controls the representation of said toy figure via a first game system input/output (I/O) device, subsequent to reading of said code of said toy by said peripheral, wherein said representation of said toy figure has one or more attributes related to said representation of said toy figure, wherein at least some of said one or more attributes are capable of being altered for completing or failing to complete challenges during said game play within said game environment, wherein said attributes are one or more of said representation's: health, strength, power, or speed;

a server subsystem configured to communicate data of said attributes related to said representation of said toy figure on a per user basis, the data of said attributes including data reflecting alterations to said attributes, with said first game system and a second game system, said server subsystem including storage for storing the data of said attributes related to said representation of said toy figure on the per user basis, said data being associated with said toy on the per user basis; wherein said server subsystem is configured to associate said code and said attributes with each of a plurality of user accounts each having a login and capable of being associated with codes for multiple toys and said attributes; and said second game system configured to receive said logins associated with said code uniquely identifying said toy from said electronic identification device on said toy; wherein said second game system is configured by program instructions to provide for game play, including providing a representation of said toy figure for game play within a game environment, in which the user controls the representation of said toy figure via a second game system I/O device, subsequent to receiving confirmation of said login and at least some of said attributes from said server subsystem by said second game system, said second game system further configured to communicate with said server subsystem and to receive from said server subsystem the data of said attributes, for a particular user account for which said login has been received, related to said representation of said toy figure for use in game play within said game environment in a subsequent gaming session on said second game system;

said first game system configured to receive said logins and to communicate with said server subsystem and to receive from said server subsystem the data of said attributes, for a particular user account for which said login has been received, related to said representation of said toy figure for use in game play within said game environment in a subsequent gaming session on said first game system.

2. A toy usable in connection with a gaming system as described in claim 1, wherein said toy further comprises at least one memory device for storing data relating to characteristics of said representation of said toy figure within said game environment.

3. A toy usable in connection with a gaming system as described in claim 2, wherein said first game system comprises a game console and said second game system comprises a mobile device.

4. A toy usable in connection with a game console and an associated peripheral, said toy comprising:
a toy figure; and
an electronic identification device containing a code uniquely identifying said toy;

said peripheral coupled to said game console, wherein said peripheral is capable of reading said code from said electronic identification device and communicating said read code to said game console;

said game console configured by program instructions to provide for game play, including providing a representation of said toy figure for game play within a game environment subsequent to receiving said read code of said toy from said peripheral, wherein said representation of said toy figure has associated therewith one or more related attributes, wherein said attributes are one or more of said representation's: health, strength, power, or speed, wherein at least some of said one or more attributes are capable of being altered during said game play within said game environment, and wherein said game console is configured to communicate with a server subsystem to identify a specific user account of a plurality of user accounts and to receive from said server subsystem data of said attributes associated with said representation of said toy for the specific user account; and wherein said server subsystem associates said code with each of the plurality of user accounts, each having a login and capable of being associated with multiple codes and said attributes, said server subsystem storing at least some different attributes associated with said code for each of the plurality of user accounts.

5. A toy usable in connection with a game console as recited in claim 4, wherein said game console is further configured to communicate with a control device to control said game play of said representation of said toy figure within said game environment.

6. A toy usable in connection with a game console as recited in claim 4, wherein said data relating to said attributes related to said representation of said toy are altered during said game play and said altered data is stored to said server subsystem.

7. A game system comprising:
a three dimensional figure having an electronic memory device embedded therein for storing a code uniquely identifying said figure and for storing attribute data reflecting characteristics of a representation of said figure within a game environment;

a first gaming platform capable of receiving said code and said attribute data from said electronic memory device;

a second gaming platform; said first gaming platform configured to provide said representation of said figure within said game environment, in which the representation of said figure is controlled via an input/output (I/O) device of the first gaming platform, subsequent to identifying said figure;

said first gaming platform further configured to send data to and receive data from a server subsystem, including said code uniquely identifying said figure and said attribute data reflecting characteristics of said representation of said figure within said game environment, and an identification of a user account of a plurality of user accounts wherein said server subsystem stores said data associated with said three dimensional figure for the identified user account, each of said user accounts having a login and capable of being associated with data associated with multiple three dimensional figures, said first gaming platform configured to utilize said attribute data received from said server subsystem, after sending said code uniquely identifying said figure and said identification of the user account to said server subsystem, or utilize said attribute data from said electronic memory device embedded in said figure in absence of a connection to said server subsystem;

said second gaming platform further configured to receive said attribute data for a particular user account from said server subsystem to provide said attribute data reflecting characteristics of said representation of said figure within a game environment after logging into a particular user account of the plurality of user accounts through use of a username and password, in which said representation of said figure is controlled via an I/O device of said second game system, operating on said second gaming platform in a subsequent gaming session.

* * * * *